Oct. 1, 1940.  F. A. M. HEPPNER  2,216,411
HYDRAULIC TORQUE TRANSMISSION
Filed Nov. 13, 1937  3 Sheets-Sheet 3
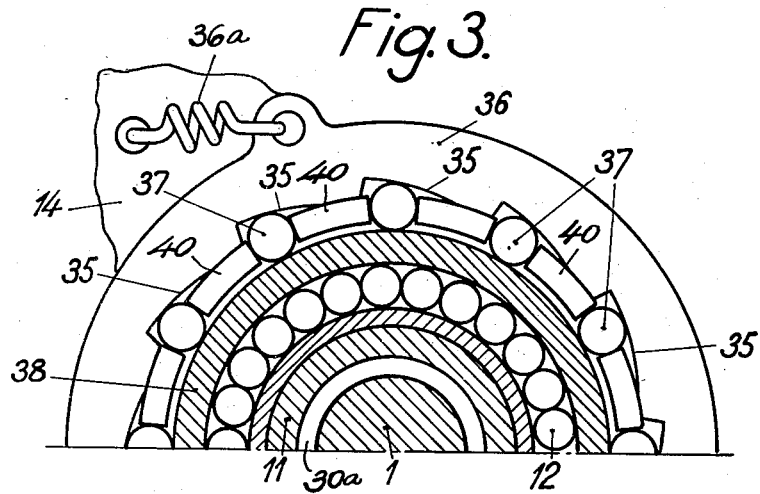
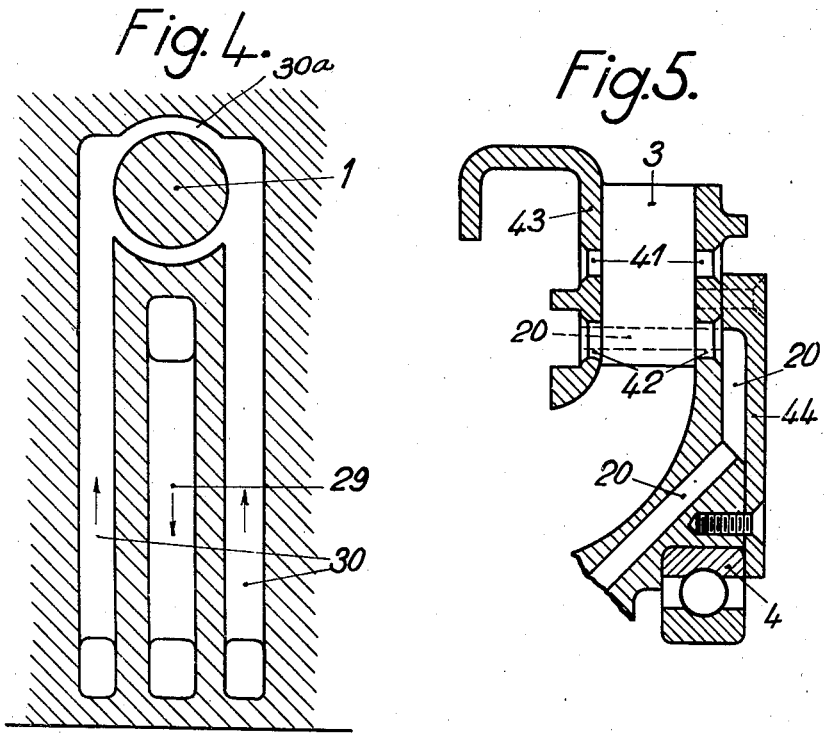
INVENTOR
Fritz Albert Max Heppner
BY
ATTORNEY Patented Oct. 1, 1940

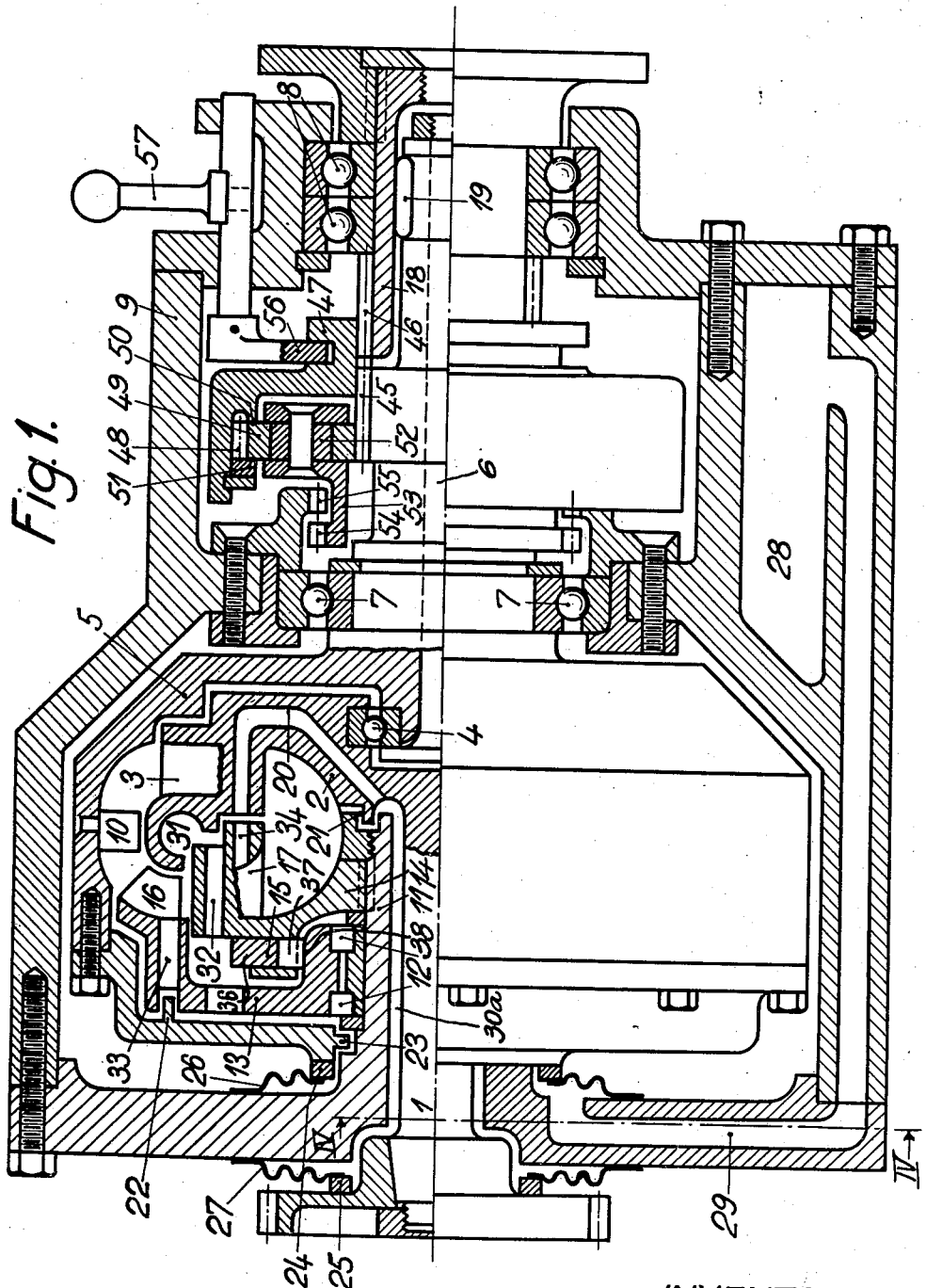

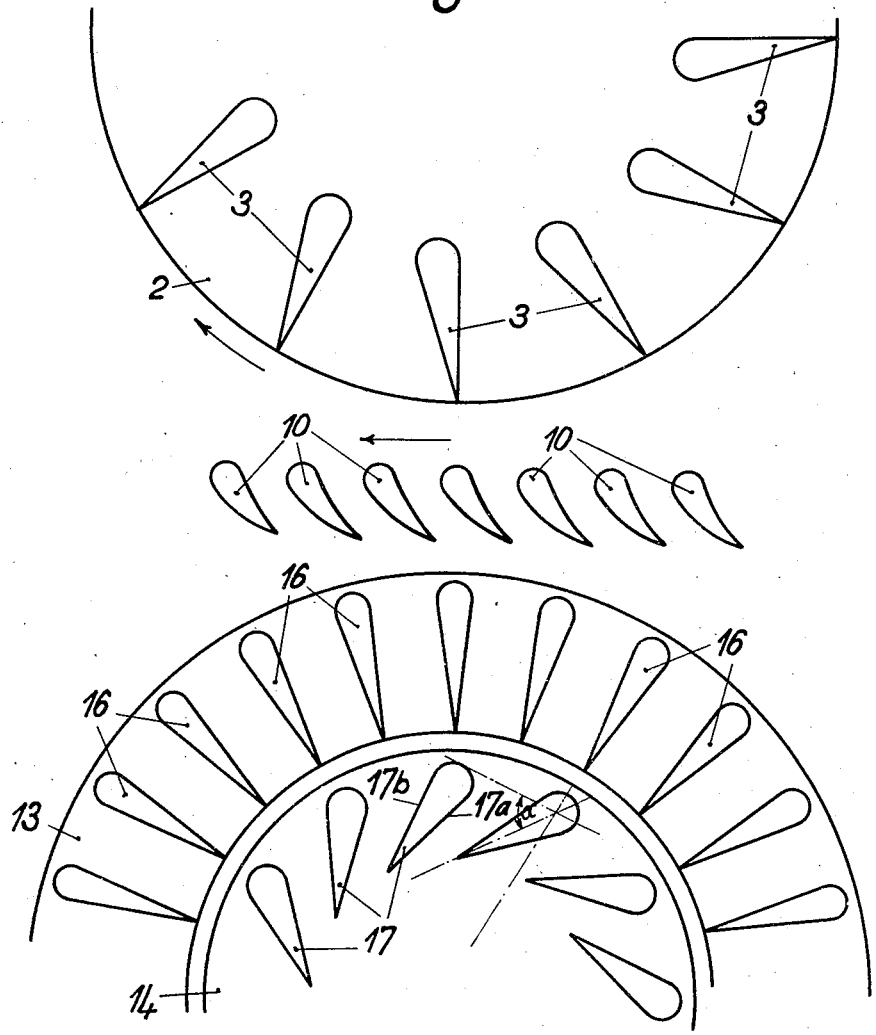

2,216,411

UNITED STATES PATENT OFFICE 2,216,411

HYDRAULIC TORQUE TRANSMISSION

Fritz Albert Max Heppner, Golders Green, London, England

Application November 13, 1937, Serial No. 174,300
In Great Britain November 17, 1936

10 Claims. (Cl. 60—54)

This invention relates to hydraulic torque transmissions for use where it is desired to transmit torque from a source such as an engine to a variable load such as a road or rail vehicle. It is of the kind incorporating a substantially toroidal space in which are located pump blades, turbine blades and reaction blades carried by respective wheels.

A principal object of the invention is to provide a transmission which will automatically adapt itself to a wide range of torque ratios with high efficiency while being of simple construction. A further object is to provide a transmission which will automatically give an overdrive of high efficiency that is to say will automatically give a higher secondary speed than primary speed when the secondary torque falls sufficiently below the primary torque.

With these and other objects in view the invention resides in the combinations described below and defined in the claims.

A preferred embodiment of the invention, suitable for use as in a motor road vehicle, is illustrated in the accompanying drawings together with certain modifications.

Figure 1 is a longitudinal section of the complete transmission which can be used between the engine and the propeller shaft, Figure 2 is a diagrammatic development of certain parts showing the profiles of the blades in the hydraulic circuit, Figure 3 is a detail partly in section showing a front view of the free wheel device, Figure 4 is a detail section on the line IV—IV of Figure 1.

Figure 5 is a detail section showing a modification in the structure of the pump wheel.

The example of hydraulic transmission illustrated comprises a primary or driving shaft 1, pump impeller wheel 2 thereon with blades 3, a driven or secondary shaft 6 carrying a turbine wheel 5 with blades 10, a first reaction wheel 13 with blades 16, and a second reaction wheel 14 with blades 17. The wheels together with a core portion, in this example formed on wheels 2, 14, form a toroidal working circuit for liquid.

The construction illustrated exemplifies a single stage hydraulic circuit, that is to say there is only a single row of turbine blades 10 which come after a row of pump blades 3 and there are no other turbine blades after a row of reaction blades. There is also a plurality of rows of reaction blades all of which are prevented from moving backwards. In the example illustrated the blades 17 in the last row are fixed as this is necessary to obtain an overdrive effect as explained below. To this end the blades 17 are carried on a wheel 14 keyed or splined to a sleeve 11 rigid with the stationary outer casing 9. Each row of reaction blades other than the last is permitted to move freely forwards. By way of example only a single row of movable reaction blades 16 is shown as in general the small advantage obtainable with more than one row as regards flow is more than counterbalanced by the extra complication and friction. In the example the blades 16 are on a wheel 13 and a free wheel device 15 between wheels 13 and 14 prevents backward rotation of wheel 13 without hindering forward rotation.

As will be seen in Figure 1, the blades 3, 10, 16, 17 are arranged in that order in a toroidal space about the main axis of the transmission. Preferably, as shown the turbine blades 10 are set in the radially outermost part of the liquid circuit. As shown in Figure 2 all the blades are of thick streamline section with well rounded entry ends. The pump blades 3 are as shown steeply set that is to say approaching the or even substantially radial and the outlet angle of the pump blades is greater than that of the turbine blades 10. The reaction blades 16, 17 are all substantially straight i. e. their streamline sections are symmetrical about a substantially straight axis. The first row, i. e. the row of blades 16 immediately succeeding the turbine blades 10 are set substantially at 90° i. e. radially or axially and the last, fixed row 17 are set at a smaller angle than 90° the opposite way to the pump and turbine blades. The angle of the blades 17 is indicated at $a$ Figure 2. Preferably the fixed blades 17 are pitched at relatively large spacing and it will be observed that since the blades in each row are separately of complete streamline section, any one row can be brought to rest by the reaction upon them in any angular position in relation to any other row without substantially affecting the flow and therefore the efficiency of the circuit.

This is an important feature because it enables a wedge and roller type of free wheel to be used which in turn enables the wheel 13 to run forward freely when the conditions explained below arise.

The circuit above described has the usual property of ability to increase the torque automatically on the secondary side in accordance with the loads and will do so efficiently over the usual range up to a ratio of 1 to 3 or 4. At maximum torque increase the liquid leaving the turbine blades has a rearward tangential component of velocity and accordingly it impinges backwards on the blades 16 but the latter cannot yield owing to the free wheel device 15; the blades 17 are also fixed and the liquid leaving blades 16 impinges on their sides 17b. Thus the blades 16, 17 coact as stationary reaction blades which are essential if there is to be any change in torque between the primary and secondary shafts. As the blades 16 have well rounded inlet ends they are able to receive and deal efficiently with liquid leaving the blades 10 whatever its backward tangential component. As the blades 16 and 17 are also of streamline section the latter are able to receive and deal efficiently with the liquid leaving the blades 16 in whatever angular position about the axis of the gear the free wheel device 15 brings the blades 16 to rest in relation to the blades 17; for the same reason the pitch of the blades 16 and 17 can be different.

As the secondary torque decreases the turbine wheel rotates faster and the backward tangential component of the liquid velocity impinging on the blades 16 and accordingly the reaction torque falls and a stage is reached when the liquid leaves the turbine blades axially and thus produces no reaction in the blades 16 but the blades 17 still produce reaction. As the reaction falls still further the turbine speed increases and the liquid leaves the turbine blades with a forward component which, owing to the freewheel, causes the wheel 13 with blades 16 to rotate forwards, the blades 16 then acting as simple guide blades, but the blades 17 still produce reaction. When the 1:1 torque condition is reached the reaction torque completely disappears. The liquid now leaves the turbine blades 16 substantially parallel to the blades 17. Under these conditions the blades 17 as well as blades 16 act as mere guide blades.

If now the secondary resistance falls the turbine wheel could not overrun the pump wheel without a stationary reaction member to provide consequent difference between primary and secondary torques; moreover this reaction torque must be in the opposite direction to that during torque increase and can only be provided by properly redirecting the liquid and not merely churning it. Such reaction is provided in the present invention by the blades 17, the blades 16 continuing to rotate forwards. The blades 17 can furnish this required reaction torque firstly because the wheel 14 carrying them being locked they do not yield to the liquid which now impinges on their sides 17a, and secondly because as they are streamlined they can deal efficiently with this flow also, in other words they do not cause substantial energy losses but divert the liquid towards the centre and thus increase the vortex speed of the liquid which being superposed on that imparted by the pump wheel increases the speed of the turbine wheel without the pump wheel running any faster, in other words the gear provides an overdrive. Owing to their rounded inlets the blades 17 can moreover deal efficiently with liquid reaching them over a fair angular range. By this means an efficiency curve can be obtained, the more or less flat topped part of which extends above synchronism of primary and secondary speeds and the total efficient range of the gear is extended accordingly. The useful extra range may be up to 25 per cent or more above primary speed.

The speed at which overdrive commences depends among other things on the angle of the fixed blades. For a small gear such as might be used in a motor vehicle an angle of 30° to 40° can be adopted. Where the added complication warrants, for example in larger gears for locomotives, with substantially constant speed motors such as induction motors, the angle may be adjustable. This may readily be arranged for by pivoting the blades and providing each with a toothed segment meshing with a toothed ring on a flared sleeve on the shaft of the wheel carrying the blades. The sleeve extends out of the circuit and is turned to adjust the blade angles as by a worm gear.

Another feature of the present circuit is that the turbine if driven from the secondary side acts as an efficient pump and thus the engine of a vehicle can be started by the vehicle or act as a brake.

To reduce blade friction, the blades as seen in side view in Figure 1 may instead of having straight leading edges, have concave leading edges. The concavity may be a continuous curve or it may be curved at the ends and straight in the centre part. The blades are still given the proper streamline section throughout i. e. the concavity does not cut away the streamline leading end.

Referring still to Figure 1 more particularly it will be seen that the pump wheel 2 is rigid with a primary shaft 1 (driven directly or indirectly by the engine not shown) this shaft traversing the sleeve 11. The parts 1, 2 are borne by a bearing 4 in a rotating casing 5 which carries the turbine blades 10 and is rigid with a secondary shaft 6 borne in the stationary casing 9 by a bearing 7, and a hollow final shaft 18 by needle rollers 19, the final shaft 18 itself being borne in the casing 9 by bearings 8.

The hydraulic circuit is charged with any suitable liquid such as oil and during operation the liquid is kept under pressure by means of a centrifugal pump constituted by a plurality of suitable bores 20 in the pump wheel and passages 34 in the stationary wheel the latter passages 34 forming the stationary outlet blading of this centrifugal pump which discharges into the working circuit between the blades 17. The passages 34 which act like the diffuser of a centrifugal pump, are essential to develop sufficient pressure in the liquid to force it into the circuit. Since such a pump is relatively efficient labyrinth seals which have considerable advantages can be used notwithstanding their relatively high leakage. Such seals are indicated at 21 between the pump wheel 2 and the stationary parts 11, 14 at 22 between the reaction wheel 13 and the rotating casing 5, and again at 23 between the casing 5 and the sleeve 11. To catch liquid leaking past the labyrinth seals, rubbing seals are provided at 24 between the casing 5 and inside of casing 9 and at 25 between the shaft 1 and the outside of casing 9. Since the pressure of liquid escaping past the labyrinth seals is low the seals 24, 25 can be held up to their work by corrugated metal diaphragms 26, 27 respectively, which are cheap and simple in construction. Final leakage may be caught by means of throwers.

A reservoir of liquid into which leakage drains is provided by a sump 28 in casing 9. As shown in Figures 1 and 4 leakage checked by seal 24 reaches the sump through a passage 29, while as shown in Figure 4 other passages 30 connect the sump 28 to the space 30a between shaft 1 and sleeve 11 from which the pump constituted by bores 20 draws.

To enable any air or gases to escape from the centre of the circuit in the annular duct 31, bores 32 are provided in the blades 17. Other bores 33 in the wheel 13 enable most of the liquid escaping past the labyrinth 22 to return directly to the circuit. In consequence of this arrangement all gas will be carried off by the leakage past seal 23 and separated from the liquid in the sump 28. Openings may be cut through the wheel 13 to relieve end thrust and give passage for the flow escaping from 31.

It will be noted that by reason of the wheel arrangement no parts rotating in opposite directions are adjacent and that in fact adjacent parts of the several wheels are in successive order of speed so that liquid friction against the wheels themselves is at a minimum. Thus the adjacent surfaces of wheel 2 and casing 5 rotate relatively at only the speed difference of the primary and secondary shafts, while the speed of wheel 13 is either substantially the same as that of casing 5, or of wheel 14 i. e. zero. Further it will be seen that casing 5 rotates thus greatly facilitating cooling of the liquid in the circuit. If necessary the casing 5 can be finned.

As above explained the wheel 13 may be brought to rest at any angular position in relation to wheel 14 and a silent roller free wheel device 15 is therefore used. As shown in Figure 3, this has the sloping tracks 35 formed in an external floating ring 36 while the rollers 37 run on a track 38 on the hub of wheel 13 and between projections 40 on the wheel 14. The ring 36 is biased towards engaged position by a spring 36a connected between it and the wheel 14. The use of a floating ring prevents jamming and enables the load to be at least partially equalized between the rollers notwithstanding unavoidable small inaccuracies in manufacture and assembly.

Figure 1 shows the pump wheel 2 and blades 3 made in a single piece as by casting. It may instead be built up as shown in Figure 5. Here the blades have integral rivets 41, 42 by which they are riveted between the wheel 2 and an inner core member 43. The bores 30 are formed partly in the wheel 2, partly in the rivets 42 and blades 3, and partly in a ring 44 secured to the wheel by screws and retaining the bearing 4.

In the example illustrated in Figure 1 the drive is carried from the secondary shaft 6 to the final shaft 18 by a forward and reverse gear. The shafts 6 and 18 have splined portions in alignment at 45 and 46 respectively. Mounted on the splined portions is an internally splined axially slidable collar 47 which in the position shown in Figure 1 positively clutches the shafts 6 and 18 together, giving forward gear. The collar has formed integral therewith internally toothed orbit gear 48 and a plurality of pinions 49, one of which is seen in Figure 1, mesh with the splines 45 which are of tooth form and the gear 48. The pinions are prevented from sliding axially with respect to the collar by end surfaces 50, 51 rigid with the latter. The pinion pivots 52 carry a sleeve 53 toothed at 54 and adapted to mesh with teeth 55 rigid with casing 9. If the collar 47 is moved to the right in Figure 1, a position is reached in which the collar is clear of splines 45 and the teeth 54, 55 are in mesh. In this position the collar 47 and thereby the final shaft 18 are rotated in reverse direction at a reduced speed depending on the ratio of teeth 45 to teeth 48.

If desired an intermediate position may be provided in which teeth 54, 55 come into mesh before the collar leaves splines 45. In such position the whole gear is locked and changes from forward to reverse or vice versa must only be made when the secondary and tail-shafts are stationary. Instead there may be a neutral, free position between forward and reverse gears, in which case synchronising means of known kind, for example bevelled faces on the teeth coming into engagement are preferably provided, to hinder crashing of the gear. The sliding of the collar 47 may be effected in any convenient way, for example by a fork 56 and handle 57.

What I claim is:

1. In a hydraulic torque transmission comprising a bladed pump wheel, a bladed turbine wheel and a bladed reaction member, forming a substantially toroidal working circuit for liquid, the combination of a plurality of separate rows of reaction blades, said reaction blades all having a streamline section with well rounded inlet ends so that each row thereof may be at rest in any angular position in relation to any other row, and means for preventing backward rotation of all of said reaction blades.

2. In a hydraulic torque transmission comprising a bladed pump wheel, a bladed turbine wheel and a bladed reaction member, forming a substantially toroidal working circuit for liquid, the combination of a plurality of separate rows of reaction blades, said reaction blades all having a streamline section with well rounded inlet ends, means for holding the last row of reaction blades stationary and means for preventing backward rotation but permitting unrestricted forward rotation of all reaction blades preceding said last row.

3. In a hydraulic torque transmission comprising a bladed pump wheel, a bladed turbine wheel and a bladed reaction member, forming a substantially toroidal working circuit for liquid, the combination of two rows of reaction blades, said reaction blades all having a streamline section with well rounded inlet ends, the first row of reaction blades being set substantially in radial planes, means for preventing backward rotation of but permitting unrestricted forward rotation of said first row of reaction blades, and means for holding the second row of reaction blades stationary.

4. In a hydraulic torque transmission comprising a bladed pump wheel, a bladed turbine wheel and a bladed reaction member, forming a substantially toroidal working circuit for liquid, the combination of a plurality of rows of substantially straight reaction blades of streamline form with well rounded entry ends, the last row of reaction blades being set at an angle directing the fluid with a tangential component in the same direction of rotation as said pump wheel, means for holding the last row of reaction blades stationary, means for preventing rearward rotation of but permitting forward rotation of all reaction blades preceding said last row.

5. In a hydraulic transmission comprising a bladed pump wheel, a bladed turbine wheel and a bladed reaction member, forming a substantially toroidal working circuit for liquid, the combination of a reservoir for liquid, means for collecting leakage from said circuit in said reservoir, a centrifugal pump runner formed in said pump wheel, and a diffuser in said reaction wheel coacting with said runner, said runner and diffuser coacting together to form a centrifugal pump drawing from said reservoir and discharging into said working circuit.

6. In a hydraulic torque transmission comprising a bladed pump wheel, a bladed turbine wheel and a bladed reaction member, forming a substantially toroidal working circuit for fluid, several rows of rotatable rows of reaction blades, one fixed row of reaction blades succeeding said rotatable rows, the first row of reaction blades being set substantially in radial planes and successive rows being set at successively increasing forward angles, successively directing the fluid with a tangential component in the same direction of rotation as said pump wheel, and means for preventing the rearward rotation but permitting unrestricted forward rotation during normal running of all reaction blades preceding said fixed row.

7. In a hydraulic torque transmission comprising a bladed pump wheel, a bladed turbine wheel and a bladed reaction member, forming a substantially toroidal working circuit for fluid, the combination of two rows only of reaction blades the first row being set substantially in radial planes and the last row set at an angle directing the fluid with a tangential component in the same direction of rotation as said pump wheel, means preventing rearward rotation but permitting unrestricted forward rotation of said first row during normal running, and means holding said last row stationary.

8. In a hydraulic torque transmission comprising a bladed pump wheel, a bladed turbine wheel and a bladed reaction member, forming a substantially toroidal working circuit for fluid, the combination of two rows of reaction blades one set at a substantially greater radius than the other, means preventing rearward but permitting unrestricted forward rotation of said greater radius row of reaction blades, and means holding the other said row of reaction blades stationary.

9. In a hydraulic torque transmission comprising a bladed pump wheel, a bladed turbine wheel and a bladed reaction member, forming a substantially toroidal working circuit for fluid, the combination of two successive rows of reaction blades the first row being at a greater radius than the second, means preventing rearward rotation but permitting unrestricted forward rotation of said first row during normal running, and means holding said second row of reaction blades stationary.

10. In a hydraulic torque transmission comprising a bladed pump wheel, a bladed turbine wheel and a bladed reaction member, forming a substantially toroidal working circuit for fluid, the combination of a row of axial flow turbine blades at the radially outermost part of said circuit, two successive rows of reaction blades following said turbine blades, the inlet of the first of said rows of reaction blades being at approximately the same radius as said turbine blades, the second of said rows of reaction blades lying radially within said first row, means preventing rearward rotation but permitting unrestricted forward rotation of said first row during normal running, and means holding said second row of reaction blades stationary.

FRITZ ALBERT MAX HEPPNER.